(12) United States Patent
Guay

(10) Patent No.: US 12,304,743 B1
(45) Date of Patent: May 20, 2025

(54) IDLER ROLLER

(71) Applicant: NHI Mechanical Motion, LLC, Claremont, NH (US)

(72) Inventor: Kevin J. Guay, Claremont, NH (US)

(73) Assignee: NHI Mechanical Motion, LLC, Claremont, NH (US)

( * ) Notice: Subject to any disclaimer, the term of this patent is extended or adjusted under 35 U.S.C. 154(b) by 144 days.

(21) Appl. No.: 18/109,423

(22) Filed: Feb. 14, 2023

(51) Int. Cl.
*B65G 39/09* (2006.01)

(52) U.S. Cl.
CPC .................................... *B65G 39/09* (2013.01)

(58) Field of Classification Search
None
See application file for complete search history.

(56) References Cited

U.S. PATENT DOCUMENTS

| | | | |
|---|---|---|---|
| 3,314,526 A | 4/1967 | Franek | |
| 5,642,800 A * | 7/1997 | East | F16C 33/76 |
| | | | 193/37 |
| 5,655,642 A * | 8/1997 | Lawrence | B65G 39/04 |
| | | | 193/37 |
| 6,148,986 A * | 11/2000 | Brink | F16C 13/022 |
| | | | 193/37 |
| 6,244,427 B1 * | 6/2001 | Syverson | H02K 7/1016 |
| | | | 198/784 |
| 6,250,639 B1 * | 6/2001 | Hayes | F16C 13/02 |
| | | | 277/565 |
| 6,641,512 B2 * | 11/2003 | Bryant, Jr. | F16J 15/4478 |
| | | | 29/898.07 |
| 6,808,063 B2 | 10/2004 | Itoh | |
| 6,814,213 B2 | 11/2004 | Dyson | |
| 7,147,596 B2 * | 12/2006 | Reynolds | B65G 39/02 |
| | | | 492/40 |
| 7,341,138 B1 | 3/2008 | Wendt | |
| 7,549,524 B2 * | 6/2009 | Eichhorn | B65G 39/09 |
| | | | 193/37 |
| 7,637,364 B1 | 12/2009 | Felton | |

(Continued)

FOREIGN PATENT DOCUMENTS

AU 2020233738 A1 7/2021

OTHER PUBLICATIONS

CPS Conveyors, Rollers, https://cpsconveyors.com.au/rollers/, 5 pages, 2020.

*Primary Examiner* — Kavel Singh
(74) *Attorney, Agent, or Firm* — Loginov & Associates, PLLC; William A. Loginov

(57) ABSTRACT

This invention provides an idler for use in a framework that supports a conveyor belt having polymer idler ends that are press fit into the opposing edges of an idler sleeve. Each idler end includes a polymer body that is overmolded onto a bearing that rotatably supports an axle, which that engages an upright of the framework. The body defines an outwardly facing face that defines a series of concentric grooves and/or ridges that confront corresponding ridges and/or grooves on a cap so as to allow for rotational motion while providing a labyrinth seal that resists infiltration of particulate debris into the bearing assembly. The bearing assembly can define a double row ball bearing. The body can include a set of concentric grooves along a base that engages an inner surface of the sleeve thereby enhancing the press fit and further resisting infiltration of debris into the bearing assembly.

8 Claims, 9 Drawing Sheets

(56) References Cited

U.S. PATENT DOCUMENTS

| | | |
|---|---|---|
| 8,196,728 B2 | 6/2012 | Gagnon |
| 8,397,906 B2 | 3/2013 | Sun |
| 8,763,778 B2 | 7/2014 | Lemay |
| 10,393,181 B2 * | 8/2019 | Newman ................ A01D 34/62 |
| 10,822,186 B2 | 11/2020 | Brunone |
| 10,981,727 B1 | 4/2021 | Guay |
| 2006/0147141 A1 | 7/2006 | Harwood |
| 2011/0284346 A1 | 11/2011 | Dunn |

* cited by examiner

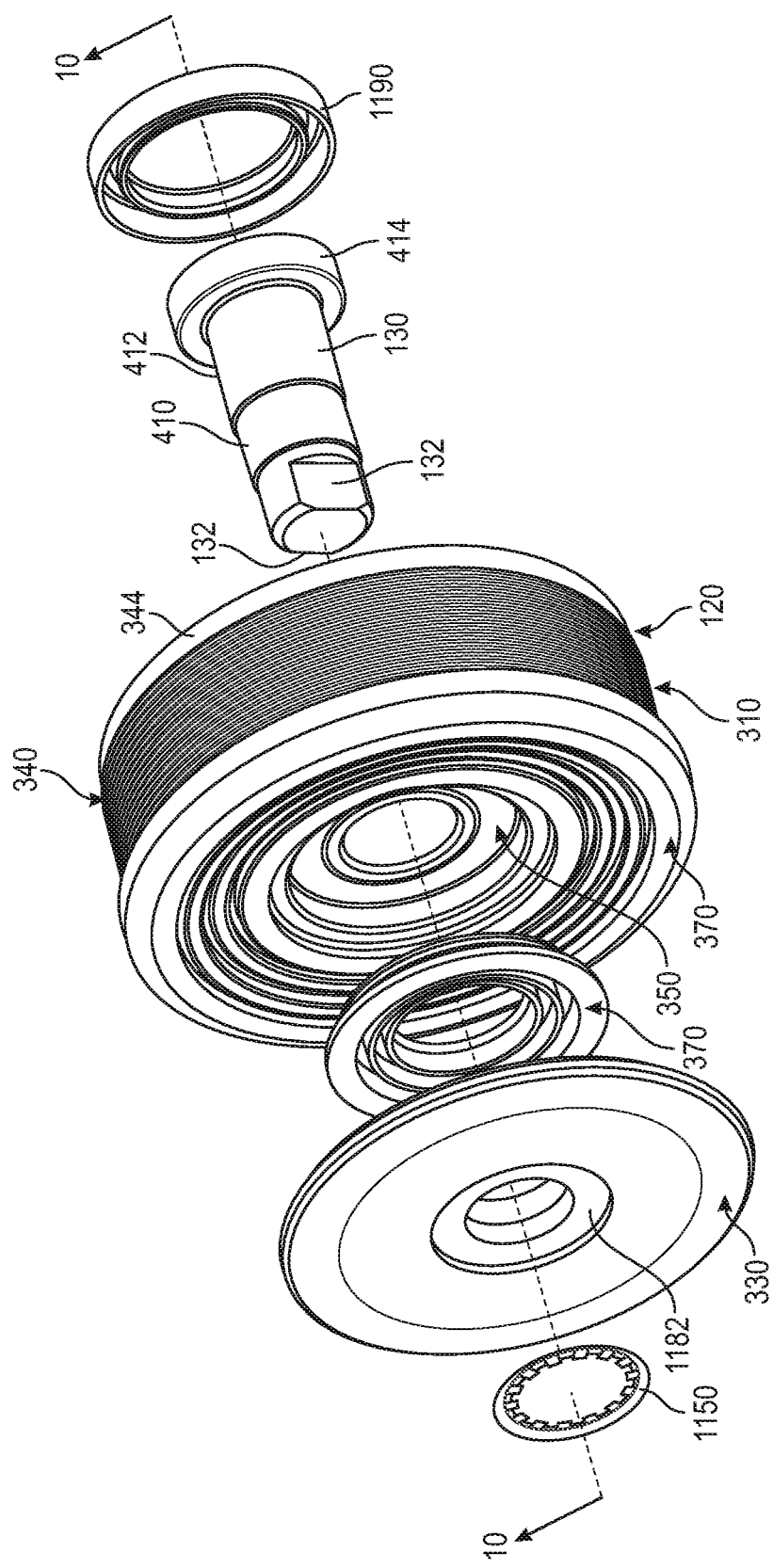

IDLER ROLLER

FIELD OF THE INVENTION

This invention relates to idlers used to rotatably support industrial conveyor belts.

BACKGROUND OF THE INVENTION

Conveyor systems that utilize belts are used in a wide range of industries and applications. Their length and width vary significantly, depending upon the needs of the jobsite. Conveyor systems can be either fixed in place or mobile. In general, the belt consists of a continuous, durable and flexible material-such as steel-reinforced or fiber-reinforced polymer (e.g. natural or synthetic rubber). The belt can be adapted to move tons of loose material over a given timeframe. To ensure that the belt remains generally planar along its moving surface, a series of (relatively) closely spaced idlers are provided between one or more drive pulleys. Such drive pulleys can be located at the end(s) of the belt, or another appropriate location along its length.

In certain applications-such as movement of coal, gravel ore, and other loose material, the conveyor belt is formed into a trough shape along its transverse cross section. The raised sides of the trough retain the material in place as it transits the length of the belt. This trough shape is maintained, in part by the arrangement of the underlying idlers. For example, a set of three idlers are employed, each of a similar axial length. The three idlers consist of a center idler that has a rotational axis parallel to the ground, and the two opposing side idlers, having rotational axes that are angled upwardly, in each of opposing directions to define an isosceles trapezoid.

The idlers are mounted in a support frame that secures fixed shafts thereto. The idler sleeves, which contact the belt, are free to rotate relative to the fixed shafts on bearings that are located on each of opposing sides of the sleeve(s). The material carried by the conveyor belt can often include small sand and grit, which is often highly abrasive. The idler ends and bearings are covered and/or sealed to some degree to resist infiltration of this sand and grit into the moving surfaces. However, the seals are not entirely effective, and eventually grit infiltrates the moving elements of the bearings, eventually causing them to fail, and the idler(s) to seize. Such seizure can cause the idler surface to abrade (and potentially destroy) the belt if the seized idler is not replaced promptly. More generally, the need to monitor and replace seized idlers adds to operational costs, and/or causes premature replacement of a damaged, and expensive, conveyor belt.

Additionally, shafts for use in constructing idlers tend to be formed from solid (e.g. steel bar stock) material, and tend to be heavy. This increases construction and shipping costs and can reduce performance under certain circumstances.

It is desirable to lighten the weight of idlers and to reduce failure of idlers through grit infiltration into bearings, and more generally, provide more efficient and cost-effective techniques for constructing such idlers.

SUMMARY OF THE INVENTION

This invention overcomes disadvantages of the prior art by providing an idler for use in a framework that supports a conveyor belt having polymer idler ends that are press fit into the opposing edges of an idler sleeve. Each idler end includes a polymer body that is overmolded onto a bearing that rotatably supports an axle, which that engages an upright of the framework. The body defines a outwardly facing face that defines a series of concentric grooves and/or ridges that confront corresponding ridges and/or grooves on a cap so as to allow for rotational motion while providing a labyrinth seal that resists infiltration of particulate debris into the bearing assembly. The bearing assembly can define, for example, a double ball bearing that enhances the stability and support of the axle. The body can include a set of concentric grooves along a base that engages an inner surface of the sleeve thereby enhancing the press fit and further resisting infiltration of particulates.

In an illustrative embodiment, an idler for use with conveyors is provided. It includes a cylindrical sleeve having opposing edges. A polymer idler end, having a body mounted is press fit at each of the opposing edges. The idler end includes a base confronting an inner surface of the sleeve, and the body defines a unitary bearing pocket that engages a bearing. An inner race of the bearing engages an axle and an outer race of the bearing engages the bearing pocket. A polymer cap engages a face of the body and overlies the bearing pocket. An inner surface of the cap and an outer surface of the body each define a plurality of confronting concentric grooves and ridges that allow the axle to rotate relative to the body. Illustratively, the body is overmolded onto the bearing and the bearing pocket thereby defines opposing shoulders that axially restrain the bearing therein. The bearing can comprise a double row ball bearing. The axle can include a flange on an innermost side that engages an optional bearing seal, the seal confronting an inner shoulder of the opposing shoulders. A polymer seal plate, surrounding the axle, and located between the body and the cap, can be provided. The seal plate can include concentric grooves and ridges that confront grooves and ridges of the cap. A locking structure can engage the axle, and can be biased axially against the cap to restrain the cap with respect to the body. The locking structure can comprise a toothed star locking washer, which can be located in an annular recess in an outer surface of the cap. The body can include a cylindrical base constructed and arranged to pressurably engage an inner surface of the sleeve. The base can further include a plurality of coaxial grooves facing the inner surface of the sleeve. The body can include an enlarged diameter rim outward from the base that confronts an adjacent edge of the sleeve. A plurality of vanes, unitarily formed with the body can extend between the base and the bearing pocket. More particularly, the vanes can extend radially and are unitarily attached to an inner side of the face. The body can be constructed from at least one of Nylon, ABS, PET, and polycarbonate.

In an illustrative embodiment, a method for constructing an idler for use in conveyors is provided. The method includes providing a cylindrical sleeve having opposing edges. A polymer idler end having a body is press-fit into each of the opposing edges, wherein the idler end includes a base confronting an inner surface of the sleeve and the body defining a unitary bearing pocket that engages a bearing, an inner race of the bearing engaging an axle and an outer race of the bearing engaging the bearing pocket. A face of the body, is engaged by a cap, which overlies a portion of the face and covers the bearing pocket. An inner surface of the cap and the and outer surface of the body thereby each define a plurality of confronting concentric grooves and ridges that allow the axle to rotate relative to the body. Illustratively, the method further includes overmolding the body onto the bearing so that the bearing pocket thereby defines opposing shoulders that axially restrain the bearing therein. A polymer seal plate is provided, which surrounds the axle, and is located between the body and the cap. The seal plate can include concentric grooves and ridges that confronting grooves and ridges of the cap. The method can further include, attaching a locking structure that engages the axle and is biased axially against the cap to restrain the cap with respect to the body, and/or pressurably engaging an inner surface of the sleeve with a cylindrical base of the body. The base can have a plurality of coaxial grooves facing the inner surface of the sleeve. The method can include, confronting an adjacent edge of the sleeve with an enlarged diameter rim of the body located outward from the base. The method can further include, forming the body with a plurality of unitary vanes that extend between the base and the bearing pocket.

BRIEF DESCRIPTION OF THE DRAWINGS

The invention description below refers to the accompanying drawings, of which:

FIG. 9 is an exploded perspective view of the removed, overmolded end of the idler of FIG. 1 including its respective axle;

DETAILED DESCRIPTION

Figure 1:
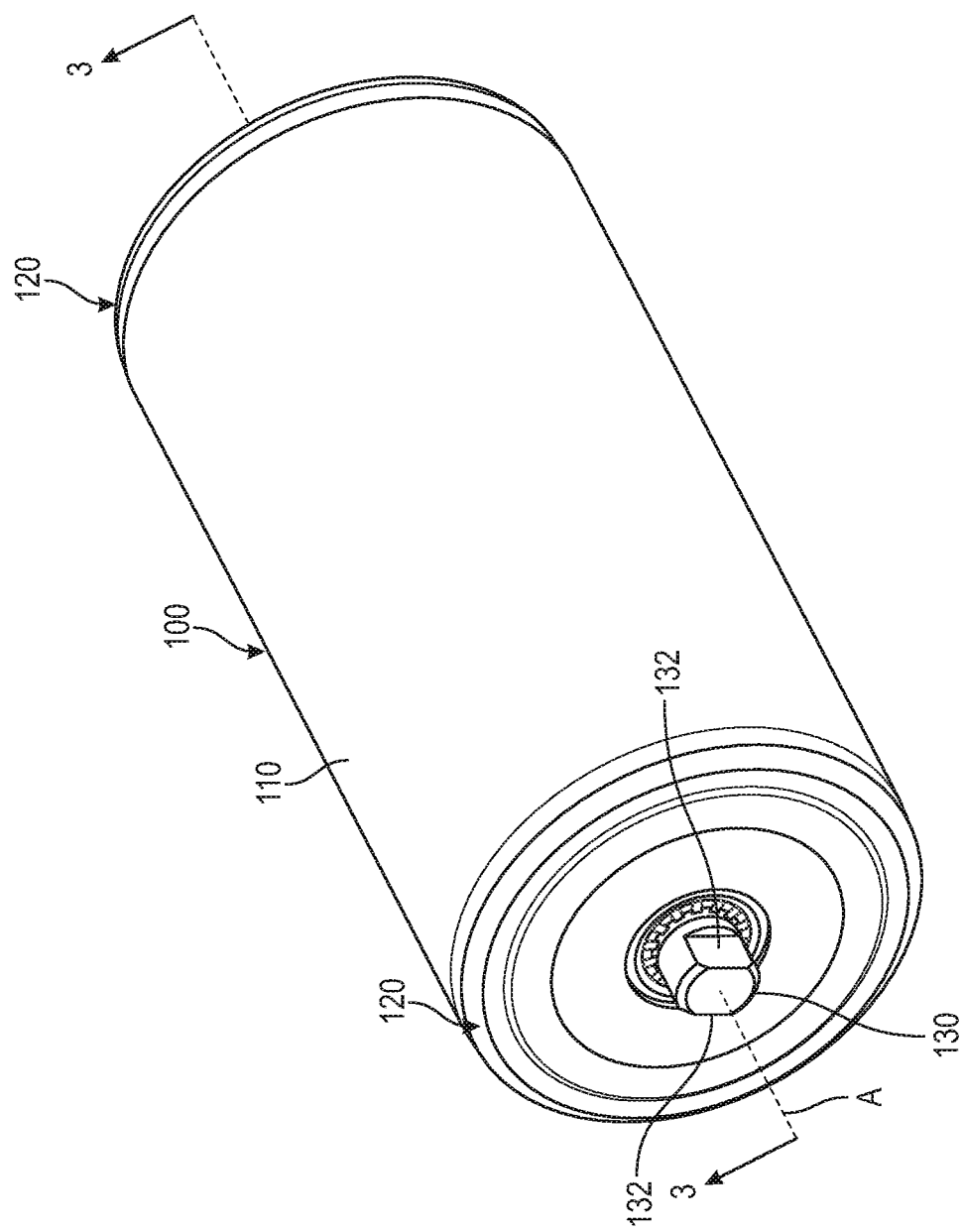
FIG. 1 is a perspective view of a conveyor idler with polymer, overmolded end for supporting bearings and an axle according to an illustrative embodiment.
Figure 2:
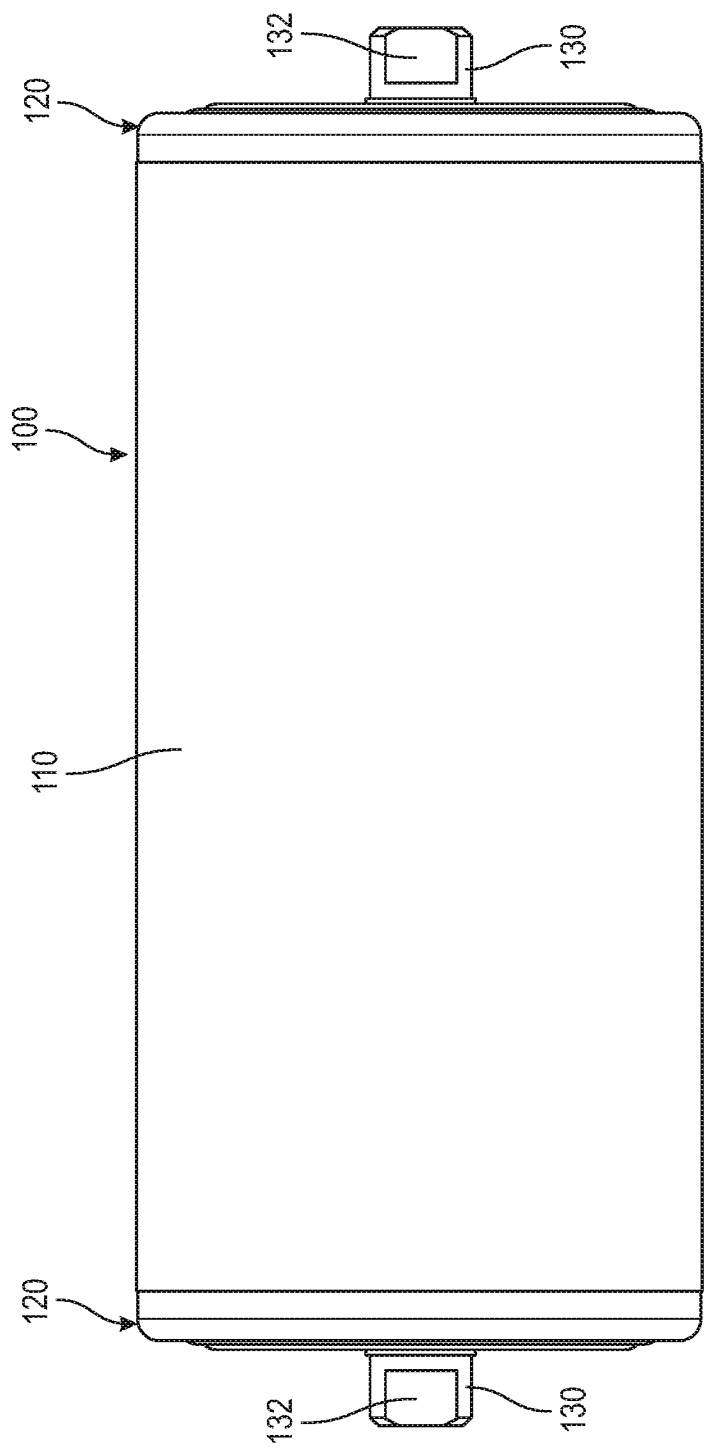
FIG. 2 is a side view of the idler of FIG. 1.

FIGS. 1-4 show an idler 100 for use with a conveyor system according to an illustrative embodiment. The idler 100 consists of a sleeve 110 that can be constructed from metal or composite material, such as seamless steel tubing of an appropriate alloy, HDPE or equivalent tube, or a combination thereof, and a pair of opposing, press fit idler ends 120. The ends are described further below, but are generally formed as a unitary molded (e.g. injection-molded), polymer structure. Each opposing idler end 120 includes a respective axle 130 constructed from an appropriately durable metal (e.g. steel alloy) of acceptable composition and hardness. Each axle 130 includes a pair of opposing flats 132 and/or other shapes to facilitate fixation in a slotted hole of a framework. In a typical application, the idler is removably mounted in a framework as part of a group of (e.g.) three in a trough-like configuration. By way of non-limiting background, an example of such and idler and framework structure is shown and described in commonly assigned U.S. Pat. No. 10,981,727, entitled CONVEYOR IDLER AND SUPPORT STRUCTURE AND METHODS FOR CONSTRUCTING THE SAME, issued Apr. 20, 2021, the teachings of which are incorporated herein by reference.

The overall length and diameter of the sleeve 110 and/or axle 130 can be highly variable, depending on the application. In various embodiments, the sleeve diameter is between approximately 3 inches and 10 inches, and the sleeve length is between approximately 6 inches and 60 inches. The axle 130 (end) is sized in diameter between (e.g.) approximately ½ inch and 2 inches. As described below, the axle defines a stepped diameter (i.e. steps 410, 412), with a rear flange 414.

With further reference to FIGS. 5-11, the construction of the press fit idler end 120 is described in further detail. The end 120 consists of a body 310 that defines an outer face 320 having a diameter (and thereby defining an outer rim) that is sufficient to confront and overlap the edge 332 of the sleeve 110 as shown. This prevents inward travel of the body 310, once fit into the edge 332 of the sleeve 110. The inner area of the face 320 is covered by a cap 330 described further below. The body further defines a smaller diameter base 340 that is sized and arranged to engage the inner surface 342 of the sleeve 110 with an appropriate degree of friction fit. As shown, the base 340 includes a set of coaxial grooves that can be between 0.020 and 0.080 deep. In this embodiment, the surface of the base defines between 4 and 12 grooves, by way of non-limiting example. The grooves terminate inwardly at a tapered end 344 that facilitates the fitting of the idler end 120 onto the sleeve 110. The grooves served to enhance the frictional hold of the end 120 relative to the sleeve and also serve to resist infiltration of particulates into the interior of the idler. In this respect, other structures of the end 120, described below, further enhance the resistance to infiltration of particulates that can otherwise clog and degrade the bearing structure 350 (described below).

The end 120 defines a set of unitarily formed, radial vanes 360 that extend inwardly from the face 320 (to which they are unitarily attached), and radially inwardly from the base 340 to a unitarily formed bearing cup 362. In this embodiment, there are 15 vanes, but greater or fewer are expressly contemplated. The thickness TV (FIG. 6) of each vane 360 is highly variable and sized relative to the overall size of the idler end 360. The thickness TV should be sufficient to support the sleeve 110 relative to the bearing 350, but sufficiently thin to allow for proper formation (i.e. even, deformation-free cooling) during a molding process.

The bearing cup 362, as depicted herein includes unitary, front and rear shoulders 1110 and 1112, respectively, which axially retain the outer race 1120 of the bearing 350 relative to the end 120. To achieve this unitary restraining structure, the bearing is located appropriately in a mold and the surrounding body 310 of the end 120 is overmolded thereonto. The overmolding process can be performed in accordance with known techniques, as applicable to the polymer being employed. The material used to form the idler end body 310 is highly variable. In general, it can comprise a durable polymer capable of moderate elastic deformation during fitting and exhibiting reasonable shock and wear resistance under expected loading. For example, Nylon, ABS, PET, Polycarbonate or similar polymer can be employed.

Figure 3:
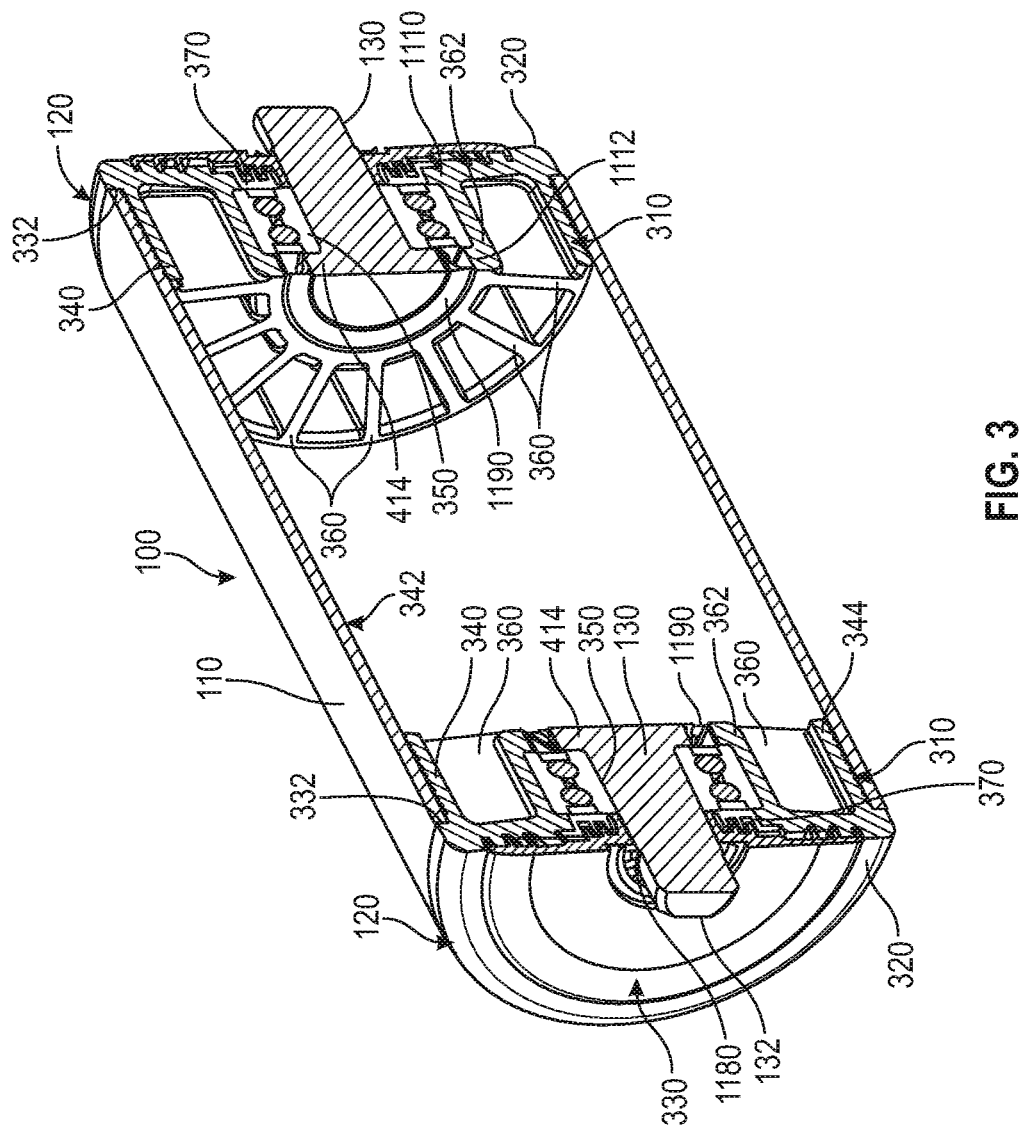
FIG. 3 is a cross-sectional perspective view of the idler, taken along line 3-3 of FIG. 1.
Figure 4:
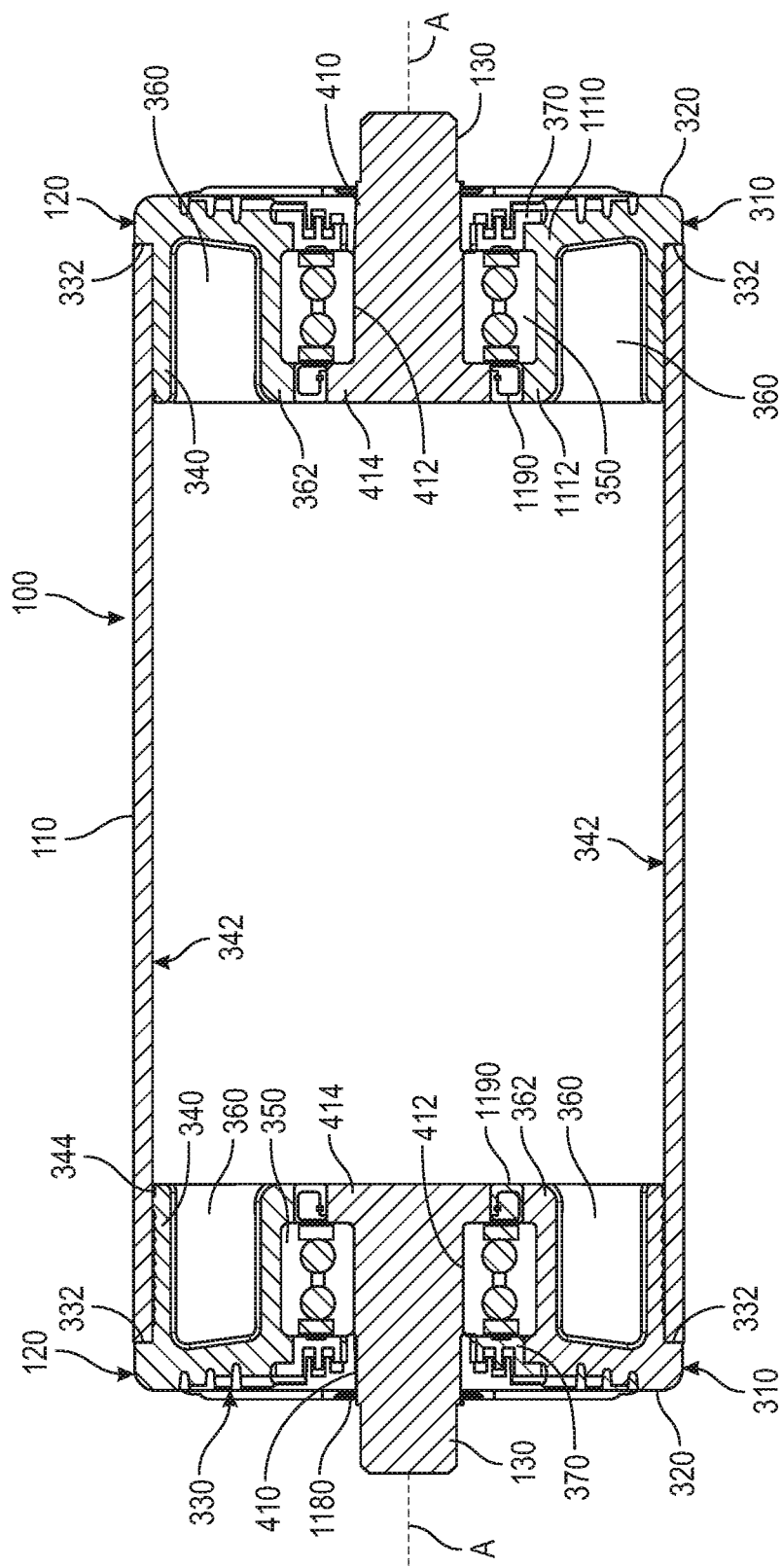
FIG. 4 is a side cross section of the idler, also taken along line 3-3 of FIG. 1.
Figure 6:
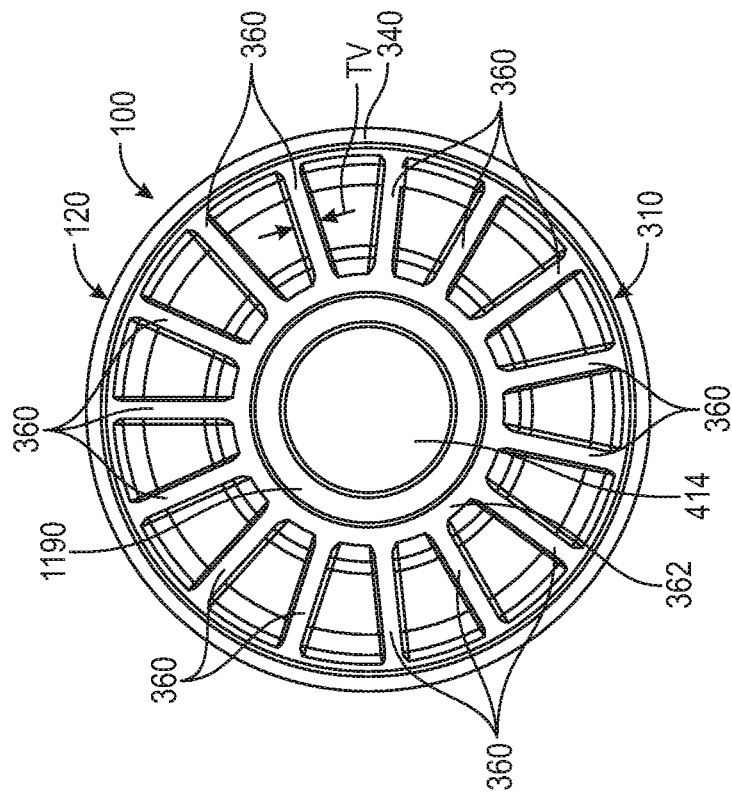
FIG. 6 is a rear view of the removed, overmolded end of the idler of FIG. 1.
Figure 5:
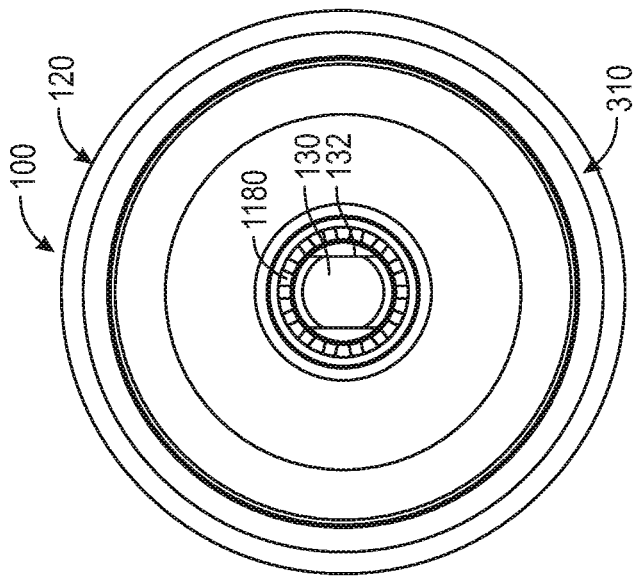
FIG. 5 is a front view of the overmolded end, shown removed from a press-fit with the sleeve of the idler of FIG. 1.
Figure 8:
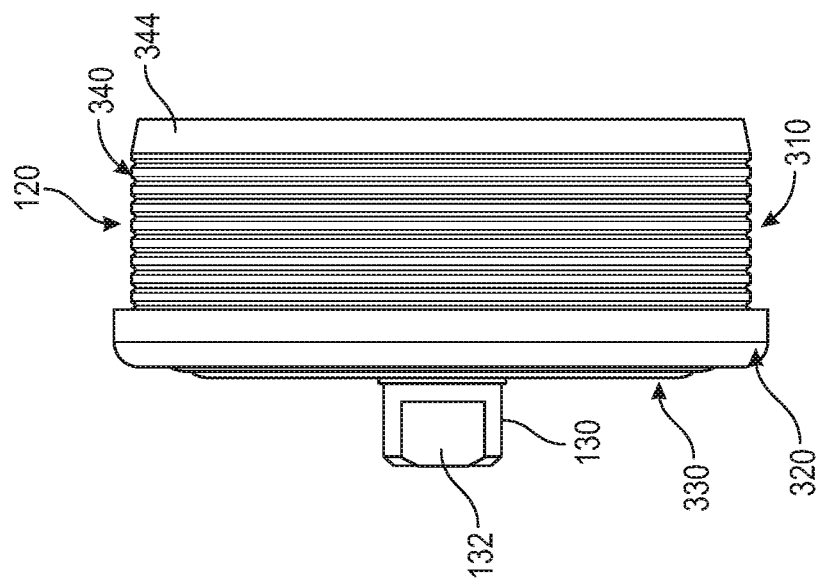
FIG. 8 is a side view of the removed, overmolded end of the idler of FIG. 1.
Figure 7:
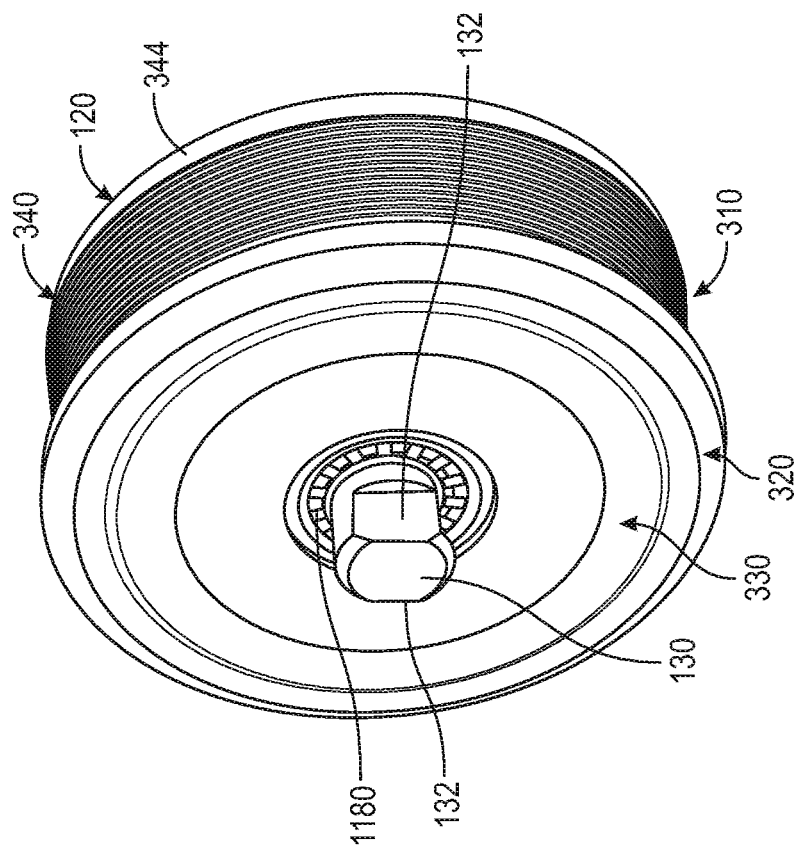
FIG. 7 is a perspective view of the removed, overmolded end of the idler of FIG. 1.
Figure 10:
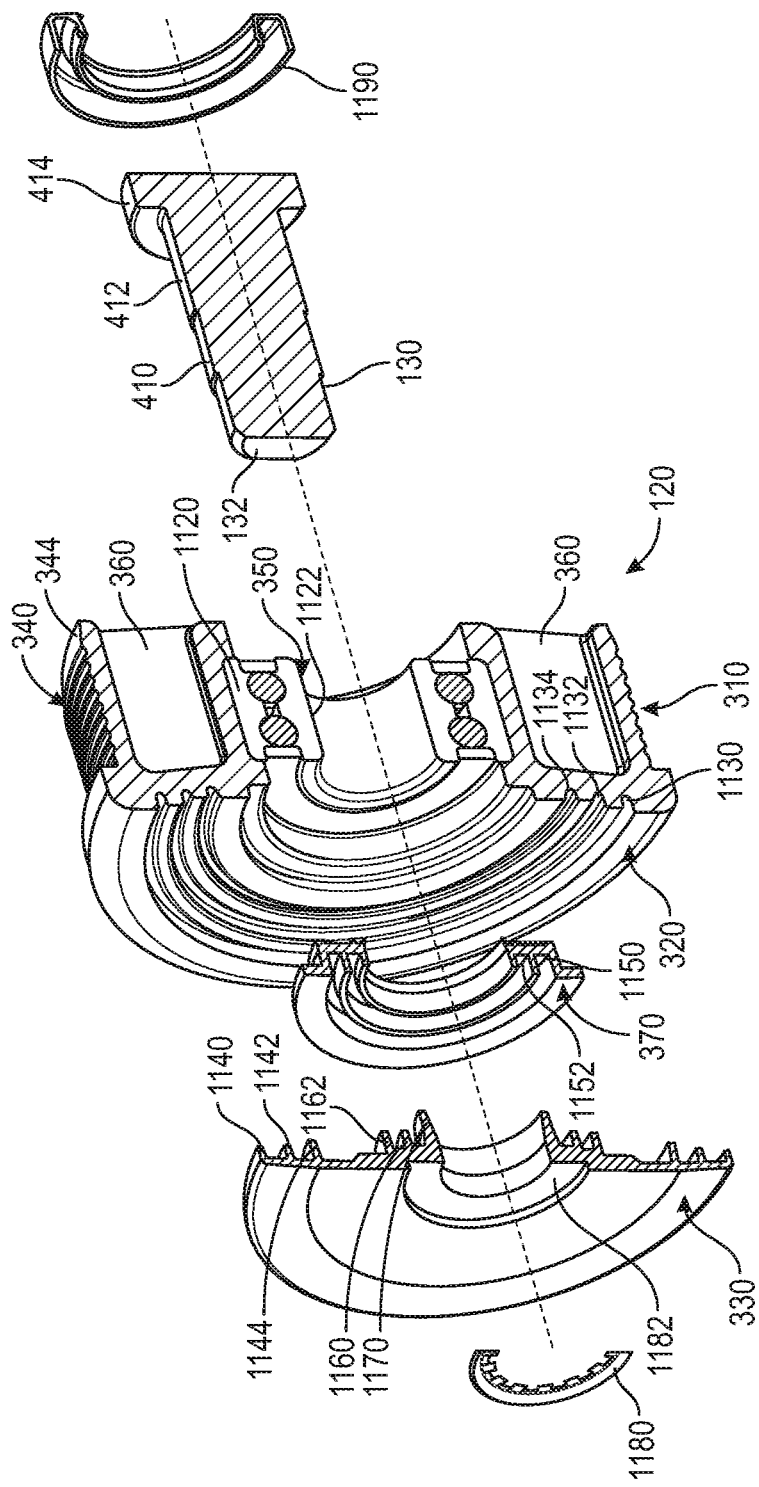
FIG. 10 is a cross-sectional perspective view of the removed, overmolded end of the idler, taken along line 10-10 of FIG. 9.
Figure 11:
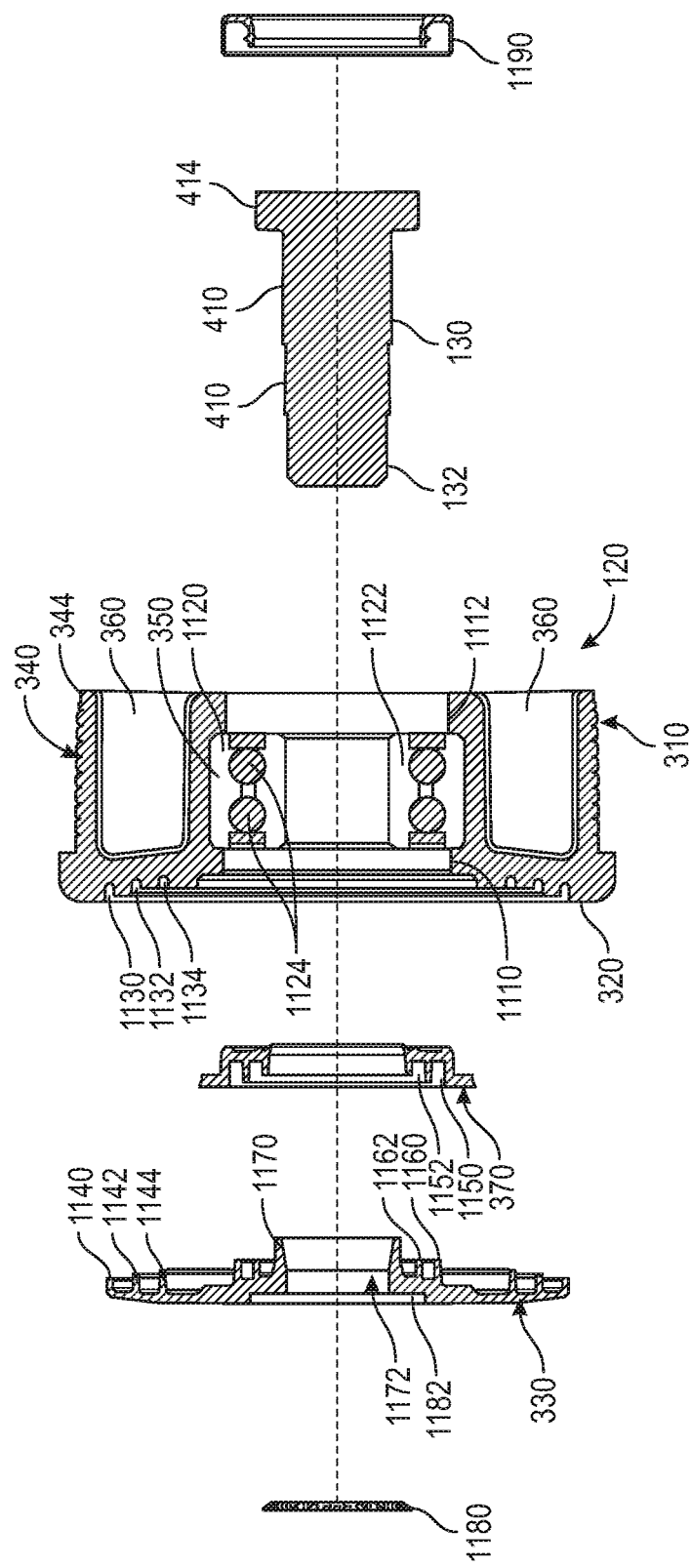
FIG. 11 is a side cross section of the removed, overmolded end of the idler, also taken along line 10-10 of FIG. 9.

Notably, the bearing 350 employs a pair of axially spaced ball bearing sets (a double row ball bearing) between the outer race 1120 and inner race 1122. This affords greater resistance to skew of the axle 130 relative to of the central axis A (FIGS. 1 and 3). Other types of bearings that resist skew and provided added support to the axle can be used in alternate embodiments—for example needle bearing and roller bearings. In the present embodiment, by way of non-limiting example, the double row ball bearing 350 can comprise a model 5204. The formed bearing pocket 362 defines sufficient axial depth to accommodate the thickness of the bearing 350 as well as an optional inward bearing seal 1190 of conventional or custom design. The seal 1190 and bearing 350 allow the end body 310 and attached sleeve 110 to rotate relative to the axle 130. The flange 414 of the axle is sized in diameter and axial depth to confront the seal 1190 fully.

The outer facing (i.e. face 320) side of each idler end 120 defines a labyrinth-type seal arrangement with respect to the cap 330 and an inner seal plate 370. As shown, the face 320 of the end body 310 includes three concentric grooves 1130, 1132 and 1134 (see, for details, FIGS. 10 and 11) that are disposed at inwardly increasing axial depth and are adapted to mate with three respective inwardly directed ridges 1140, 1142 and 1144 on the inner face of the cap 330. Similarly, the inner seal plate 370 includes two concentric grooves 1150 and 1152 adapted to confront corresponding concentric ridges 1160 and 1162, respectively on the inner face of the cap 330. The ridges 1160 and 1162 encircle an axially inwardly extended flange 1170 that defines a central hole 1172 for passage of the axle 130 by way of a press fit. As shown, for example, in the assembled cross sections of FIGS. 3 and 4, the confronting grooves and ridges of the cap 330, face 320 and seal plate 370 allow for free rotation of the sleeve 110 relative to the axle 130, while resisting infiltration of particulate contaminants that can degrade, and cause failure of, the bearing 350. The cap 330 and seal plate are retained with respect to the body 310 and axle 130 using an internal tooth star locking washer 1180. Other types of locking arrangements—for example, split rings, etc. can be employed to axially restrain the assembly in an integral structure.

Note that the particular arrangement of ridges and grooves, as well as the relative diameters of the various interengaging cap and seal components on the outer face of the idler end, can vary. These components are generally arranged to provide a set of confronting, coaxial surfaces with abrupt direction changes (radially inwardly) that provide an obstructed pathway for particulates to reach the center of the idler.

It should be clear that the above-described idler provides a readily manufactured and less costly overall structure, with superior performance and contamination resistance. The idler can be constructed in a variety of sizes and adapted to handle heavy loads through used of a double ball bearing assembly.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of mechanical, electro-mechanical, electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using mechanical, electromechanical and/or electronic hardware, software consisting of a non-transitory computer-readable medium of program instructions, or a combination of hardware and software. Accordingly, this description is meant to be taken only by way of example, and not to otherwise limit the scope of this invention.

The invention claimed is:

1. An idler for use with conveyors comprising:
   a cylindrical sleeve having opposing edges;
   a polymer idler end having a body mounted in a press fit at each of the opposing edges, the idler end including a base confronting an inner surface of the sleeve and the body defining a unitary bearing pocket that engages a bearing, an inner race of the bearing engaging an axle and an outer race of the bearing engaging the bearing pocket;
   a polymer cap that engages a face of the body and overlies the bearing pocket wherein an inner surface of the cap and an outer surface of the body each define a plurality of confronting concentric grooves and ridges that allow the axle to rotate relative to the body,
   wherein the body is overmolded onto the bearing and the bearing pocket thereby defines opposing shoulders that axially restrain the bearing therein, and
   wherein the bearing comprises a double row ball bearing;
   a polymer seal plate, surrounding the axle, and located between the body and the cap, the seal plate including concentric grooves and ridges that confront grooves and ridges of the cap; and
   a locking structure that engages the axle and is biased axially against the cap to restrain the cap with respect to the body,
   wherein the locking structure comprises a toothed star locking washer.

2. The idler as set forth in claim 1 wherein the axle includes a flange on an innermost side that engages an optional bearing seal, the seal confronting an inner shoulder of the opposing shoulders.

3. The idler as set forth in claim 1 wherein the toothed star locking washer is located in an annular recess in an outer surface of the cap.

4. The idler as set forth in claim 1 wherein the body includes a cylindrical base constructed and arranged to pressurably engage an inner surface of the sleeve, the base including a plurality of coaxial grooves facing the inner surface of the sleeve.

5. The idler as set forth in claim 4 wherein the body includes an enlarged diameter rim outward from the base that confronts an adjacent edge of the sleeve.

6. The idler as set forth in claim 1, further comprising, a plurality of vanes, unitarily formed with the body and extending between the base and the bearing pocket.

7. The idler as set forth in claim 6 wherein the vanes extend radially and are unitarily attached to an inner side of the face.

8. The idler as set forth in claim 1, wherein the body is constructed from at least one of Nylon, ABS, PET, and polycarbonate.

\* \* \* \* \*